(12) United States Patent
Lonappan et al.

(10) Patent No.: US 9,027,029 B2
(45) Date of Patent: *May 5, 2015

(54) METHOD FOR ACTIVATING PROCESSOR CORES WITHIN A COMPUTER SYSTEM

(71) Applicant: International Business Machines Corporation, Armonk, NY (US)

(72) Inventors: Rijoy B. Lonappan, Bangalore (IN); Shashikumar Mandya Krishnappa, Bangalore (IN); Sethupathy R. Sivakumar, Austin, TX (US); Venkatesh N. Sripathi Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/852,059

(22) Filed: Mar. 28, 2013

(65) Prior Publication Data

US 2014/0298345 A1 Oct. 2, 2014

(51) Int. Cl.
*G06F 9/46* (2006.01)
*G06F 9/455* (2006.01)
*G06F 9/50* (2006.01)
*G06F 9/48* (2006.01)

(52) U.S. Cl.
CPC .............. *G06F 9/45558* (2013.01); *G06F 9/50* (2013.01); *G06F 9/4843* (2013.01)

(58) Field of Classification Search
None
See application file for complete search history.

(56) References Cited

U.S. PATENT DOCUMENTS

| 7,865,751 | B2 * | 1/2011 | Monferrer et al. | 713/322 |
| 7,966,511 | B2 | 6/2011 | Naveh et al. | |
| 8,327,126 | B2 * | 12/2012 | Bell et al. | 713/100 |
| 8,392,659 | B2 * | 3/2013 | Anand et al. | 711/130 |
| 8,677,371 | B2 * | 3/2014 | Flemming et al. | 718/104 |
| 2008/0065770 | A1 * | 3/2008 | Romero et al. | 709/226 |
| 2011/0023047 | A1 * | 1/2011 | Memik et al. | 718/104 |
| 2011/0088038 | A1 * | 4/2011 | Kruglick | 718/104 |
| 2011/0131583 | A1 * | 6/2011 | Geraci | 718/104 |
| 2011/0271283 | A1 * | 11/2011 | Bell et al. | 718/102 |
| 2012/0054750 | A1 * | 3/2012 | Saripalli | 718/100 |
| 2012/0173906 | A1 | 7/2012 | Elnozahy et al. | |
| 2013/0074090 | A1 * | 3/2013 | Kumar et al. | 718/104 |
| 2014/0196050 | A1 * | 7/2014 | Yu et al. | 718/104 |
| 2014/0317389 | A1 * | 10/2014 | Wenisch et al. | 712/229 |

OTHER PUBLICATIONS

Nvidia whitepaper, "A Multi-Core CPU Architecture for Low Power and High performance", Feb. 2011, (NVDIA_2011.pdf, pp. 1-17).*

* cited by examiner

*Primary Examiner* — Emerson Puente
*Assistant Examiner* — Hiren Patel
(74) *Attorney, Agent, or Firm* — Russell Ng PLLC; Parashos Kalaitzis

(57) ABSTRACT

A technique for activating processor cores within a computer system is disclosed. Initially, a value representing a number of processor cores to be enabled within the computer system is received. The computer system includes multiple processors, and each of the processors includes multiple processor cores. Next, a scale variable value representing a specific type of tasks to be optimized during an execution of the tasks within the computer system is received. From a pool of available processor cores within the computer system, a subset of processor cores can be selected for activation. The subset of processor cores is activated in order to achieve system optimization during an execution of the tasks.

4 Claims, 2 Drawing Sheets

METHOD FOR ACTIVATING PROCESSOR CORES WITHIN A COMPUTER SYSTEM

BACKGROUND OF THE INVENTION

1. Technical Field

The present invention relates to computer systems having multiple processors in general, and, in particular, to a method for activating processor cores within a computer system.

2. Description of Related Art

Today's computer servers often include multiple processors with each processor having multiple cores. If a customer needs more computing capacity from a computer server, the customer can simply buy (or lease) additional resources. Since those resources, such as processors, are already present within the computer server, the customer can activate the needed resources via a software tool after paying for the resources. One such service offered by International Business Machines Corporation is called the Capacity on Demand service. The Capacity on Demand service allows a user to activate processors and memory units on the user's computer server when the user's workload requires such additional resources. Those resources may be activated either for a specific time period, or permanently. After activation, those resources can be used seamlessly with the user's other resources that have already been activated previously.

Currently, the Capacity on Demand service simply activates processor cores randomly, as they become available within each processor. Thus, the server performance delivered to a user may not be the most optimal. Consequently it would be desirable to provide an improved method for activating processor cores within a computer system having multiple processors.

SUMMARY OF THE INVENTION

Performance can be improved when the characteristics of a task to be performed on the additional cores are known, and corresponding processor cores are activated accordingly. In accordance with a preferred embodiment of the present invention, a value representing a number of processor cores to be enabled within a computer system is received. The computer system includes multiple processors, and each of the processors includes multiple processor cores. Next, a scale variable value representing a specific type of tasks to be optimized during an execution of the tasks within the computer system is received. From a pool of available processor cores within the computer system, a subset of processor cores can be selected for activation. The subset of processor cores is activated in order to achieve system optimization during an execution of the tasks.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
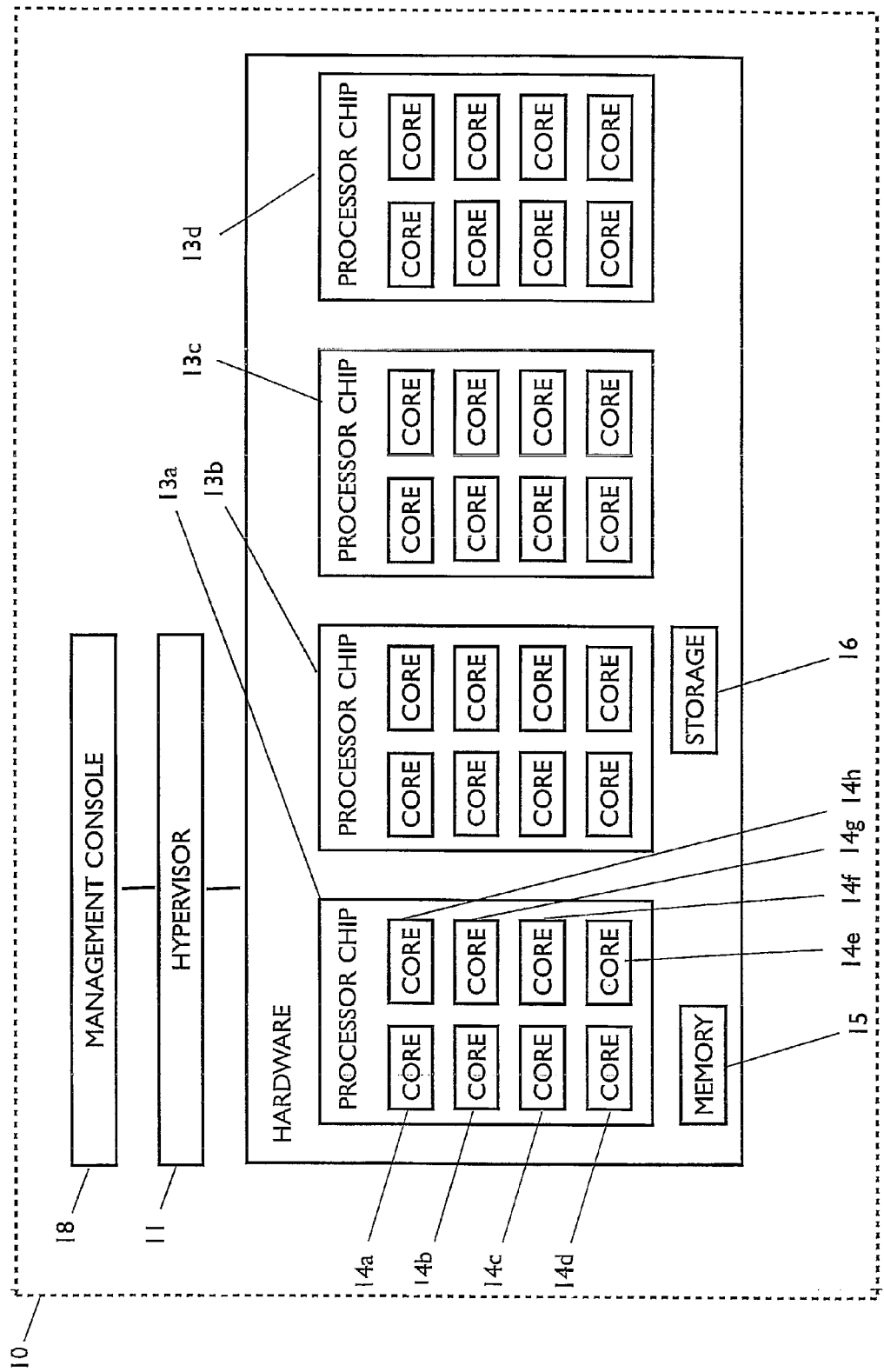
FIG. 1 is a block diagram of a computer system in which a preferred embodiment of the present invention can be incorporated.

Referring now to the drawings and in particular to FIG. 1, there is illustrated a block diagram of a computer system in which a preferred embodiment of the present invention can be incorporated. As shown, a computer system 10 includes multiple processors 13a-13d, each containing multiple processor cores. For example, processor 13a includes processor cores 14a-14h. Although four processors each with eight processor cores are shown here by way of example, one skilled in the art will appreciate that more or fewer processors, each with more or fewer processor cores may be present. Computer system 10 also includes other resources such as memory devices 15 and a storage subsystem 16. Processor cores, such as processor cores 14a-14h, can execute instructions and communicate with system resources, such as memory devices 15 and storage subsystem 16, independent of each other.

The management of processors 13a-13d, memory devices 15 and storage subsystem 16 may be performed via a software tool known as a hypervisor 11. In addition, hypervisor 11 enables multiple operating systems to share the hardware resources within computer system 10 by allowing each operating system to "think" it has exclusive control of all the hardware resources within computer system 10. Hypervisor 11 allocates resources to each operating system and ensures the operating systems cannot interfere with each other. As part of its resource allocation function, hypervisor 11 can also enable and disable various resources within computer system 10.

Another software tool known as a management console 18 enables a human system manager to configure various system components as appropriate to various tasks computer system 10 is expected to perform. Management console 18 communicates system configuration changes to hypervisor 11 that performs the necessary component activation and deactivation.

If the nature of a task to be performed on computer system 10 is known, computer system 10 can be configured to perform such task better. For example, if a task is processor-intensive, system performance can be improved by allocating the task to the processor cores within a minimum number of processors. This may also leave some processors unused, which can be turned off to save power. On the other hand, if a task requires intensive communication with memory while not processor-intensive, system performance can be improved by allocating the task to processor cores spreading out over a maximum number of processors.

A human system manager can use management console 18 to specify the above-mentioned task requirement to direct hypervisor 11 to enable the appropriate processor cores among processors 13a-13d within computer system 10. The complete allocation can be performed during the boot up period of computer system 10. Once the allocation has been completed, hypervisor 11 saves that configuration in a non-volatile memory (not shown) so computer system 10 will have the correct configuration on subsequent boots until the next configuration change by the human system manager.

Figure 2:
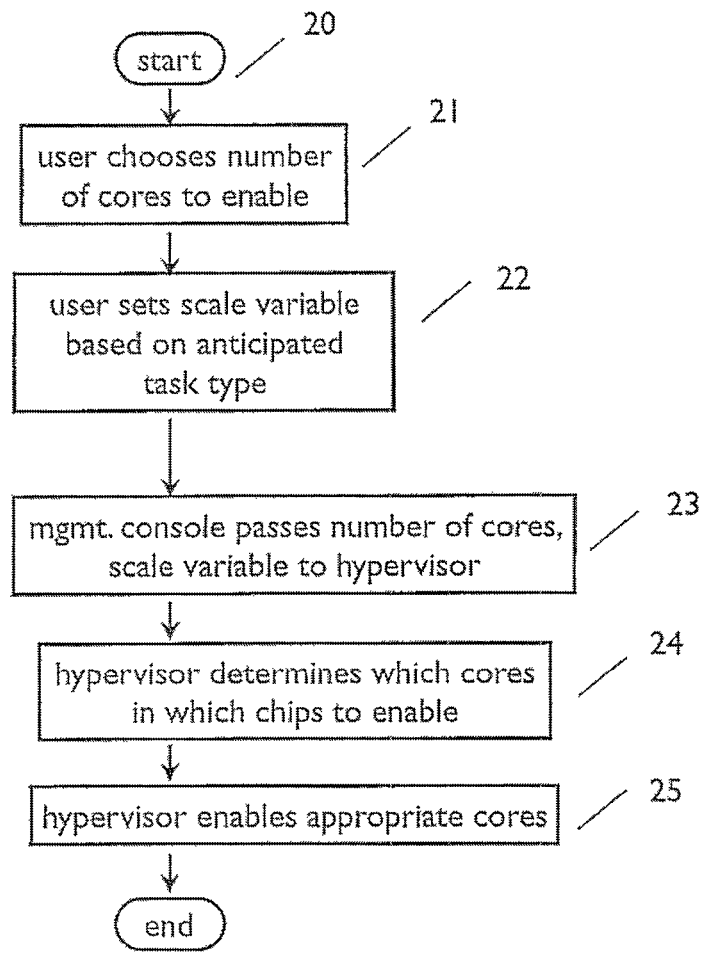
FIG. 2 is a flowchart of a method for activating processor cores to allow optimal performance of the computer system of FIG. 1.

With reference now to FIG. 2, there is illustrated a flowchart of a method for activating processor cores within a computer system, such as computer system 10 from FIG. 1, in accordance with a preferred embodiment of the present invention. Starting at block 20, a management console, such as management console 18 from FIG. 1, awaits for a user, such as a human system manager, to enter a desired number of processors cores to be enabled, as shown in block 21. Next, management console 18 awaits for the user to enter a scale variable related to a desired task optimization, as depicted in block 22. The user can set the scale variable based on the task type. The scale variable can be set to a value ranging from 1 to the maximum number of processor cores within a processor. For example, if the user intends to optimize computer system 10 for processor-centric tasks, the scale variable should be set to a maximum value (i.e., maximum number of processor cores within one processor). On the other hand, if the user intends to optimize computer system 10 for I/O-centric tasks, the scale variable is set to a minimum value (i.e., 1). Otherwise, the scale variable can be set to a value at somewhere in the middle of its range.

Alternatively, instead of obtaining from a user for information such as a desired number of processors cores to be enabled and/or a scale variable related to a desired task optimization, those information can be automatically obtained from a historical database (not shown). The historical database keeps track of the number of processors cores enabled as well as the scale variable for each task that was being optimized in the past.

After the number of processor cores and the scale variable have been defined and entered into management console 18 by the user, management console 18 passes those parameters to a hypervisor, such as hypervisor 11 from FIG. 1, as shown in block 23. In turn, hypervisor 11 determines which processor cores in which processors to be enabled, as depicted in block 24, and then enables those processor cores accordingly, as shown in block 25.

Hypervisor 11, in block 24, determines how many processor cores in which processors to enable by using the following equation:

$$X_n = m - \left(\left\lceil \frac{n}{S} \right\rceil \bmod m\right) \quad (1)$$

where n represents the number of processor core to be enabled, S represents a scale variable, m represents the total number of processors within a computer system, and $X_n$ represents a processor number. The notation $\lceil z \rceil$ refers to the smallest integer equal to or greater than z, i.e., a rounding up of z to the next integer.

As an example, computer system 10 (from FIG. 1) has four processors 13a-13d and each of processors 13a-13d has eight processor cores 14a-14h; thus, each of the processor cores can be numbered from 1 to 32. If a user desires to enable ten processor cores while optimizing for processor-centric tasks, then m=4 and S=8 (i.e., the maximum number of processor cores per processor). Equation (1) will be used to solve for each of the ten processor cores to be enabled, as follows:

$$X_1 = 4 - \left(\left\lceil \frac{1}{8} \right\rceil \bmod 4\right) = 3$$

so processor core 1 should be assigned to processor 3.

$$X_2 = 4 - \left(\left\lceil \frac{2}{8} \right\rceil \bmod 4\right) = 3$$

so processor core 2 should be assigned to processor 3.

$$X_3 = 4 - \left(\left\lceil \frac{3}{8} \right\rceil \bmod 4\right) = 3$$

so processor core 3 should be assigned to processor 3.

$$X_4 = 4 - \left(\left\lceil \frac{4}{8} \right\rceil \bmod 4\right) = 3$$

so processor core 4 should be assigned to processor 3.

$$X_5 = 4 - \left(\left\lceil \frac{5}{8} \right\rceil \bmod 4\right) = 3$$

so processor core 5 should be assigned to processor 3.

$$X_6 = 4 - \left(\left\lceil \frac{6}{8} \right\rceil \bmod 4\right) = 3$$

so processor core 6 should be assigned to processor 3.

$$X_7 = 4 - \left(\left\lceil \frac{7}{8} \right\rceil \bmod 4\right) = 3$$

so processor core 7 should be assigned to processor 3.

$$X_8 = 4 - \left(\left\lceil \frac{8}{8} \right\rceil \bmod 4\right) = 3$$

so processor core 8 should be assigned to processor 3.

$$X_9 = 4 - \left(\left\lceil \frac{9}{8} \right\rceil \bmod 4\right) = 2$$

so processor core 9 should be assigned to processor 2.

$$X_{10} = 4 - \left(\left\lceil \frac{10}{8} \right\rceil \bmod 4\right) = 2$$

so processor core 10 should be assigned to processor 2.

Hence, eight processor cores are to be activated in processor 3, and two processor cores are to be activated in processor 2. Since a maximum number of processor cores has been packed into as few chips as possible, maximizing performance can be achieved for processor-centric tasks.

Next, consider the same computer system 10, the same need to enable ten processor cores, but optimizing for I/O-centric tasks instead. Now, m=4 and S=1 (i.e., the minimum number). Equation (1) will be used to solve for each of the ten processor cores to be enabled, as follows:

$$X_1 = 4 - \left(\left\lceil \frac{1}{1} \right\rceil \bmod 4\right) = 3$$

so processor core 1 should be assigned to processor 3.

$$X_2 = 4 - \left(\left\lceil \frac{2}{1} \right\rceil \bmod 4\right) = 2$$

so processor core 2 should be assigned to processor 2.

$$X_3 = 4 - \left(\left\lceil \frac{3}{1} \right\rceil \bmod 4\right) = 1$$

so processor core 3 should be assigned to processor 1.

$$X_4 = 4 - \left(\left\lceil \frac{4}{1} \right\rceil \bmod 4\right) = 4$$

so processor core 4 should be assigned to processor 4.

$$X_5 = 4 - \left(\left\lceil \frac{5}{1} \right\rceil \bmod 4\right) = 3$$

so processor core 5 should be assigned to processor 3.

$$X_6 = 4 - \left(\left\lceil \frac{6}{1} \right\rceil \bmod 4\right) = 2$$

so processor core 6 should be assigned to processor 2.

$$X_7 = 4 - \left(\left\lceil \frac{7}{1} \right\rceil \bmod 4\right) = 1$$

so processor core 7 should be assigned to processor 1.

$$X_8 = 4 - \left(\left\lceil \frac{8}{1} \right\rceil \bmod 4\right) = 4$$

so processor core 8 should be assigned to processor 4.

$$X_9 = 4 - \left(\left\lceil \frac{9}{1} \right\rceil \bmod 4\right) = 3$$

so processor core 9 should be assigned to processor 3.

$$X_{10} = 4 - \left(\left\lceil \frac{10}{1} \right\rceil \bmod 4\right) = 2$$

so processor core 10 should be assigned to processor 2.

In this case, two processor cores are activated in processor 1, three processor cores are activated in each of processors 2 and 3, and two processor cores are activated in each of processor 4. Processor cores are spread out among as many processors as possible in order to maximize system performance for I/O-centric tasks.

Next, consider the same computer system 10, the same need to enable ten processor cores, but not optimizing for either type of task, so the user has set S=4. Equation (1) will be used to solve for each of the ten processor cores to be enabled, as follows:

$$X_1 = 4 - \left(\left\lceil \frac{1}{4} \right\rceil \bmod 4\right) = 3$$

so processor core 1 should be assigned to processor 3.

$$X_2 = 4 - \left(\left\lceil \frac{2}{4} \right\rceil \bmod 4\right) = 3$$

so processor core 2 should be assigned to processor 3.

$$X_3 = 4 - \left(\left\lceil \frac{3}{4} \right\rceil \bmod 4\right) = 3$$

so processor core 3 should be assigned to processor 3.

$$X_4 = 4 - \left(\left\lceil \frac{4}{4} \right\rceil \bmod 4\right) = 3$$

so processor core 4 should be assigned to processor 3.

$$X_5 = 4 - \left(\left\lceil \frac{5}{4} \right\rceil \bmod 4\right) = 2$$

so processor core 5 should be assigned to processor 2.

$$X_6 = 4 - \left(\left\lceil \frac{6}{4} \right\rceil \bmod 4\right) = 2$$

so processor core 6 should be assigned to processor 2.

$$X_7 = 4 - \left(\left\lceil \frac{7}{4} \right\rceil \bmod 4\right) = 2$$

so processor core 7 should be assigned to processor 2.

$$X_8 = 4 - \left(\left\lceil \frac{8}{4} \right\rceil \bmod 4\right) = 2$$

so processor core 8 should be assigned to processor 2.

$$X_9 = 4 - \left(\left\lceil \frac{9}{4} \right\rceil \bmod 4\right) = 1$$

so processor core 9 should be assigned to processor 1.

$$X_{10} = 4 - \left(\left\lceil \frac{10}{4} \right\rceil \bmod 4\right) = 1$$

so processor core 10 should be assigned to processor 1.

In this case, two processor cores are activated in processor 1, and four processor cores are activated in each of processors 2 and 3. Processor cores have been allocated in an arrangement in between the two extremes.

Hence, a hypervisor does not need to have special code for each different type of performance optimization a user might require. Instead, using the scale value, number of processor cores to be allocated, and number of processor cores per processor in a computer system, the hypervisor can allocate processor cores appropriate to any optimization within the range. This gives a user the ability to fine tune system performance for a particular task, by comparing performance obtained with various scale value settings and selecting the setting resulting in the best performance.

As has been described, the present invention provides a method of activating processor cores within processor chips to optimize for the types of tasks expected to be performed.

It is also important to note that although the present invention has been described in the context of a fully functional computer system, those skilled in the art will appreciate that the mechanisms of the present invention are capable of being distributed as a program product in a variety of computer-readable device or media such as compact discs and digital video discs.

While the invention has been particularly shown and described with reference to a preferred embodiment, it will be understood by those skilled in the art that various changes in form and detail may be made therein without departing from the spirit and scope of the invention.

What is claimed is:

1. A non-transitory computer-readable storage device having computer program product for activating processor cores within a computer system, said computer-readable storage device comprising:

program code for receiving a value representing a number of processor cores to be enabled within said computer system having a plurality of processors, wherein at least one of said processors includes a plurality of processor cores;

program code for receiving a scale variable value representing a specific type of tasks to be optimized during an execution of said tasks within said computer system;

program code for selecting from a pool of available processor cores within said computer system a subset of processor cores to be activated, wherein said program code for selecting is performed by:

$$X_n = m - \left(\left\lceil \frac{n}{S} \right\rceil \bmod m\right)$$

from n=1 to T, where T represents said number of processor cores to be enabled, S represents said scale variable, m represents a total number of processors within said computer system, and $X_n$ represents a processor number; and program code for activating said subset of processor cores to achieve system optimization during an execution of said tasks.

2. The computer-readable storage device of claim 1, wherein said scale variable value is set to 1 to produce a processor core allocation optimized for input/output-intensive operations.

3. The computer-readable storage device of claim 1, wherein said scale variable value is set to a maximum number of processor cores within one processor to produce a processor core allocation optimized for processor-intensive operations.

4. The computer-readable storage device of claim 1, wherein said value representing a number of processor cores is received from a historical database, and said scale variable value is received from said historical database.

* * * * *